US009578506B2

(12) United States Patent
Falk et al.

(10) Patent No.: US 9,578,506 B2
(45) Date of Patent: *Feb. 21, 2017

(54) METHOD AND ARRANGEMENT FOR PROVIDING A WIRELESS MESH NETWORK

(71) Applicant: Unify GmbH & Co. KG, Munich (DE)

(72) Inventors: Rainer Falk, Poing (DE); Florian Kohlmayer, Starnberg (DE)

(73) Assignee: Unify GmbH & Co. KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/809,479

(22) Filed: Jul. 27, 2015

(65) Prior Publication Data
US 2015/0358817 A1 Dec. 10, 2015

Related U.S. Application Data

(63) Continuation of application No. 12/525,456, filed as application No. PCT/EP2008/050891 on Jan. 25, 2008, now Pat. No. 9,131,372.

(30) Foreign Application Priority Data

Feb. 14, 2007 (DE) .................. 10 2007 007 345

(51) Int. Cl.
*G06F 7/04* (2006.01)
*H04W 12/06* (2009.01)
(Continued)

(52) U.S. Cl.
CPC ......... *H04W 12/06* (2013.01); *H04L 63/0876* (2013.01); *H04W 84/22* (2013.01)

(58) Field of Classification Search
CPC ..... H04W 12/06; H04W 88/08; H04W 12/04; H04W 84/22; H04L 63/08; H04L 2209/80; H04L 63/062; H04L 67/2876
See application file for complete search history.

(56) References Cited

U.S. PATENT DOCUMENTS 7,823,188 B2* 10/2010 Annic .............. H04L 63/0281
713/168
2002/0124196 A1* 9/2002 Morrow ............ G06F 1/3203
713/320

(Continued)

FOREIGN PATENT DOCUMENTS

| CN | 1829179 A | 9/2006 |
| EP | 1890518 A2 | 2/2008 |
| WO | 2006119281 A2 | 11/2006 |

OTHER PUBLICATIONS

International Search Report for PCT/EP2008/050891 dated Jun. 5, 2008.

(Continued)

*Primary Examiner* — Shewaye Gelagay
*Assistant Examiner* — Carlton Johnson
(74) *Attorney, Agent, or Firm* — Buchanan Ingersoll & Rooney PC

(57) ABSTRACT

The invention relates to a method for providing a wireless local network, wherein stationary communication devices and mobile communication devices are connected in the manner of a mesh as the sub-network, which is particularly connected to an infrastructure network and configured to exchange authentication messages with at least one communication device, which is particularly disposed in the infrastructure network and provides an authentication function. During an attempt to establish a first link by a first communication device connected to a communication device providing the authentication function to a second communication device connected to the communication device providing the authentication function, an authenticator role to be assigned as part of an authentication process is associated with the first and second communication devices, wherein at least one property correlating with the connection (Continued)

State of the Art is analyzed for meeting a criterion. The invention further relates to an arrangement comprising means for carrying out the method.

20 Claims, 2 Drawing Sheets

(51) Int. Cl.
*H04L 29/06* (2006.01)
*H04W 84/22* (2009.01)

(56) References Cited

U.S. PATENT DOCUMENTS

| | | | | |
|---|---|---|---|---|
| 2003/0125067 | A1* | 7/2003 | Takeda | H04W 52/247 455/522 |
| 2004/0172527 | A1* | 9/2004 | Ono | G06F 1/266 713/100 |
| 2006/0200678 | A1* | 9/2006 | Yamada | H04L 9/0833 713/182 |
| 2008/0034207 | A1* | 2/2008 | Cam-Winget | H04L 63/205 713/163 |
| 2008/0155126 | A1* | 6/2008 | Swain | H04L 12/403 709/251 |

OTHER PUBLICATIONS

English translation of the International Preliminary Report on Patentability Jan. 2009.

Tony Braskich et al.: "Efficient Mesh Security and Link Establishment" IEEE 802.11-06/1470R3, Nov. 2006 (Nov. 2006), Seiten 1-60, CP002480982.

Ming Shen et al.: Wi-Mesh Alliance: "802.11 TGs MAC Enhancement Proposal" IEEE 802.11 Task Group "S" Nov. 2005 (Nov. 2005), Seiten 124-141, XP002480983.

\* cited by examiner

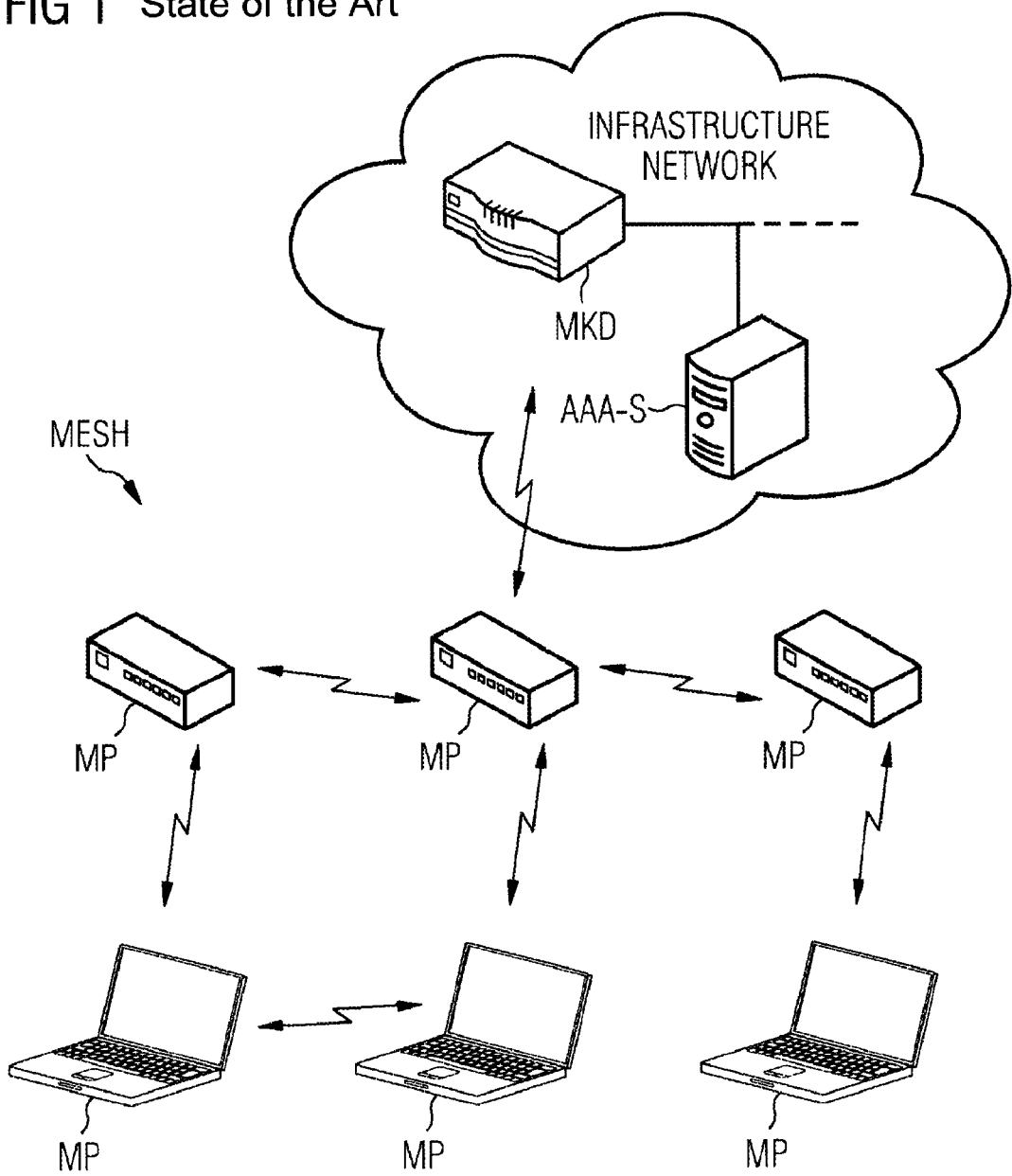
FIG 1  State of the Art

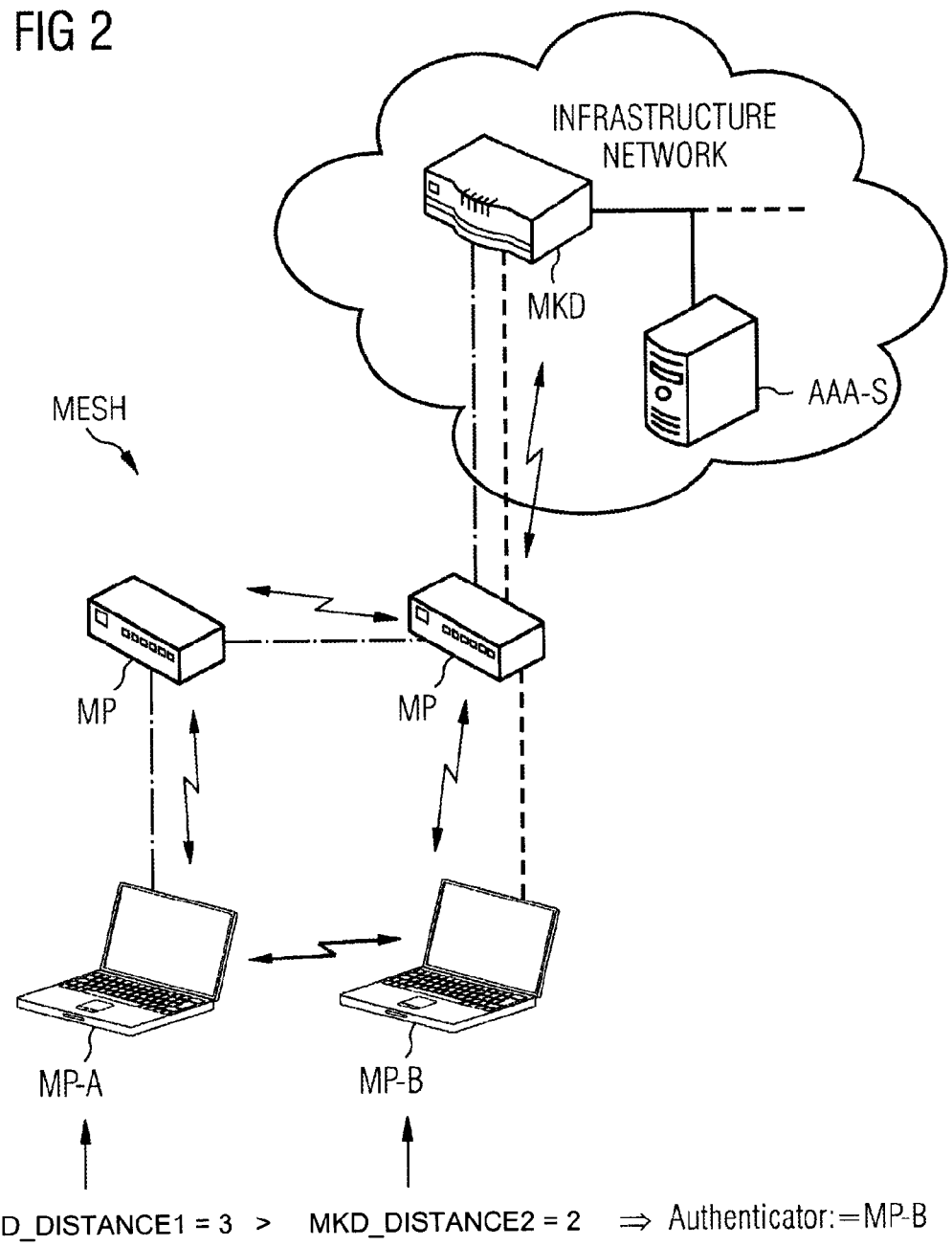

METHOD AND ARRANGEMENT FOR PROVIDING A WIRELESS MESH NETWORK

CROSS-REFERENCE TO RELATED APPLICATIONS

This application is a continuation application of U.S. patent application Ser. No. 12/525,456, which is the United States National Stage filing under 35 U.S.C. §371 of International Application No. PCT/EP2008/050891, filed on Jan. 25, 2008, and claiming priority to German Application No. 10 2007 007 345.5, filed on Feb. 14, 2007. International Application No. PCT/EP2008/050891 and German Application No. 10 2007 007 345.5 are incorporated by reference herein.

BACKGROUND OF THE INVENTION

Field of the Invention

Embodiments of the invention relate to methods for providing a wireless mesh network as well as arrangements to provide a wireless mesh network.

Background of the Art

A wireless mesh network is a meshed network of terminals, described as "nodes", which is implemented, by way of example, in a wireless local area network (WLAN). The nodes may be either infrastructure nodes or "end user nodes", such as a notebook or a PDA.

In a mesh network, a mobile node can transfer data originating from another mobile node to still another mobile node or a base station. In a mesh network, long distances can be traversed, in particular on uneven or difficult terrain. Mesh networks additionally work very reliably, as every mobile node is connected to several other nodes. If a node fails, e.g., due to a hardware defect, its neighboring nodes seek out a different data transfer route. Mesh networks can include fixed or mobile devices.

When adding a new, generally mobile, node, an authentication takes place. This authentication is generally carried out using an authentication server "AAA server"; the mesh network can be coupled via a gateway component or a "mesh key distributor", which provides encryption material, to an infrastructure network.

In order to authenticate nodes or computers, the EAP (extensible authentication protocol) is generally used. The EAP protocol is used in WLANs to secure network access. Various specific authentication procedures, known as EAP methods, can be transported via the EAP protocol, e.g., EAP-TLS, EAP-AKA, EAP-SIM, TTLS, PEAP-MSChapv2. In authentication, a cryptographic key or session key—MSK, EMSK (MSK: master session key; EMSK: extended master session key) is determined, which is subsequently used to protect data communications, as in link layer encryption. The authentication of a participant occurs between the participant (supplicant) and an authentication server (AAA server). If authentication is successful, the authentication server sends the result of authentication and the session key—MSK—originating from the authentication to an authenticator, such as a WLAN access point. Communication between the access point and the authentication server normally occurs via the radius or diameter data transfer protocol, in which the session key—MSK—is sent as a data attribute to the access point—AP—as part of an EAP success message. The session key—MSK—transferred is then used in an 802.11 4-way handshake—802.11 WHS— between the participant and the access point in accordance with IEEE standard 802.11.

Thus, authentication on the basis of an authentication server—AAA server—distinguishes between the roles of supplicant and authenticator, which, specifically, results in the supplicant authenticating itself via the authenticator to an AAA server, which, in turn, informs the authenticator of the result. Depending on the result, the authenticator either grants or denies the supplicant access to the mesh network.

While in a normal network, e.g., a WLAN-based network, a network login involves one client seeking access to one network, the situation in a mesh network is symmetrical, as the authentication takes place between two mesh nodes of the same type. This gives rise to the problem of needing to determine which of the two nodes acts as authenticator and which as supplicant.

From US2006/0200678, a so-called "role arbitration" is known. This is carried out using the MAC address, based on random values selected by each node on the basis of a "hop count" comparison or based on "processing capabilities."

WO2006/119281 generally discloses a "role arbitration" between mesh nodes, with the role being determined based on random numbers.

BRIEF SUMMARY OF THE INVENTION

Thus, the objective of the present invention is to disclose an improved method and arrangement for the provision of a wireless mesh network.

In accordance with the method disclosed by the invention for the provision of a wireless mesh network, in which stationary communication devices as well as mobile communication devices are connected as a subnet in the form of a mesh, which is connected, in particular, to an infrastructure network, and is designed such that it can exchange authentication messages with at least one communication device carrying out the function of authentication, in particular one arranged within the network; in the case of an attempt to create a first link by a first communication device connected with the communication device performing the authentication function to a second communication device connected to the communication device performing the authentication function, the authenticator role, which must be assigned to one of the two communications devices as part of an authentication, is assigned to the communication device in which at least one property correlating with connection is tested for meeting a criterion.

The method disclosed by the invention optimizes the necessary role assignment such that connection properties are also taken into account; thus, the network is able to work more efficiently. Furthermore, this allows, on average, for better resource allocation.

In an advantageous embodiment of the invention, the first and second communications devices will measure the value correlating to the connection. This has, by way of example, the advantage that the AAA server is relieved of making such determinations and the basic effect disclosed by the invention—that efficiency is increased and capacity is equally allocated—is further improved.

In a preferred embodiment, the correlating value used is the number of hops to the communication device performing the authentication function, as this value allows for a good estimate of the time needed to send messages, with the preferred criterion being the testing of at least one value determinable based on a routing log, in particular a mesh routing log. In particular, the criterion tested is the minimum number of hops, as this allows for the detection of the connection that allows for faster handling of the authentication process.

Alternatively, or additionally, in another advantageous embodiment, the correlating value measured is a physical property of the connection, in particular signal quality, with the criterion being the testing for a value indicating better quality. This variation also allows for fast handling, as, for example, multiple retransmissions necessitated by interruptions of the physical connection are avoided.

A further advantageous additional or alternative embodiment is the measurement of a capacity of the connection to the communication device providing the authentication function and/or of communication devices realizing the connection to the communication device performing the authentication function as the correlating value, with the minimum capacity being used as the criterion. This embodiment, like the aforementioned embodiments, contributes to increased efficiency and faster handling. Furthermore, this procedure also ensures better allocation of the load within the network.

Alternatively, but especially additionally, one embodiment measures the type of power supply of the communication device that performs the authentication function and/or provides the connection to the communication device performing the authentication function is measured as the correlating value, with network power supply being used as the criterion. This prevents potential interruptions due to lack of power to operate the relevant nodes, thus avoiding time waste and increasing the speed of handling in this embodiment, as well.

If, in an alternative development or in addition to the foregoing embodiments, the processor usage of the communication device performing the authentication function and/or the communication device providing the connection to the communication device performing the authentication function is measured, with the criterion being the minimum processor use, the advantage provided by the invention of distributing the load for more efficient and, ultimately, faster handling is further supported.

If, where the test results coincide, the authenticator role to be assigned is assigned on the basis of a comparison of the media access control (MAC) addresses of the first and second communication device, a default position exists such that the system will enter a predefined state even in such a case.

Preferably, of the two communication devices, the role of authenticator is assigned to the one with the lesser MAC address.

In another development of the invention, if the first and second communication device have connections to several communication devices performing authentication functions (AAA-S, MKD),
  a) an intersection of communication devices performing authentication functions (AAA-S, MKD) is formed that comprises the communication devices performing an authentication function, to which the first and second communication devices each are connected,
  b) if the intersection comprises at least one first and one second communication device performing an authentication function (AAA-S, MKD), the authenticator role is assigned to the device of the two in which at least one property correlating with the connection best meets the criterion;
  c) if the intersection is empty, the role of authenticator is assigned to the one of the two communication devices in which at least one property correlating with a communication device performing the authentication function best fulfills the criterion.

This makes it possible to use the invention even with "scaling", and further allows for fast mesh-internal authentication in such a scenario.

If the authentication method is adapted on the basis of the test result, in particular the selection of a method defined based on the extensible authentication protocol (EAP), handling can be even further fine-tuned to meet the requirements of the circumstances.

The problem on which the invention is based is also solved by means of an arrangement for the provision of a wireless local network, which includes the means to carry out the method, by allowing for the method to be carried out.

Further details on the invention as well as benefits will be discussed in greater detail based on the scenario shown in FIG. 1 and an exemplary embodiment shown in FIG. 2.

BRIEF DESCRIPTION OF THE FIGURES

FIG. 1: Example of a mesh network
FIG. 2: Schematic representation of an exemplary embodiment of the invention in a mesh network that implements the invention.

DETAILED DESCRIPTION OF THE INVENTION

As discussed above, FIG. 1 shows a mesh network MESH connected with an infrastructure network INFRASTRUCTURE NETWORK. It can be seen that, in addition to node MP, there are also infrastructure nodes such as a mesh key distributor MKD and an authentication, authorization, accounting authentication server AAA-S.

Here, the mesh key distributor MKD is a gateway node that couples the mesh network MESH with the infrastructure network INFRASTRUCTURE NETWORK and handles key distribution. The mesh key distributor MKD is also a mesh node, which has the additional task of handling the aforementioned key distribution or gateway functionality within the mesh network MESH.

It can further be seen that between some of the nodes MP shown, authenticated direct connections, i.e., links between the nodes MP exist (indicated by the lightning bolt).

To create such a link between two nodes MP, there must be authentication by the authentication server with the above-described allocation of roles between authenticator and supplicant.

So that a node MP can be assigned the authenticator role, at least one of the nodes requires a connection to the AAA server AAA-S. This connection can pass through several links, i.e., over several of the nodes MP; MKD.

If only one of the mesh nodes has a connection to the authentication server AAA-S, and thus can act as authenticator, the allocation of roles is clear (if none can act as authenticator, no authentication is possible).

If, however, both mesh nodes are capable of acting as authenticators, the procedure disclosed by the invention applies.

In FIG. 2, a first node MP-A and a second node MP-B of nodes MP are emphasized as nodes establishing a direct connection.

Here, it can be seen that both the first node MP-A has a first connection to the authentication server AAA-S, indicated as a dotted line in FIG. 2, and that the second node has a second connection to the authentication server AAA-S, indicated as a dashed line in FIG. 2, such that both the first node MP-A and the second node MP-B are available for the role of authenticator.

The exemplary embodiment also comprises the core element disclosed by the invention, which is that a mesh node, with the aid of an "information element", signals a metric that indicates how "good" the first connection and/or second connection to the authentication server AAA-S is, which is used for authentication and connects the mesh network with the mesh key distributor MKD or another node responsible for authentications within the mesh network based on which the role of authenticator is assigned.

"Metric", as is known, generally refers to a system of indicators or a procedure to measure a quantifiable value. Thus, according to the invention, a value correlating with the connection to the authentication server AAA-S is determined.

Thus, this value is a measurement for how well suited the mesh node is to take on the role of authenticator in authentication (the authenticator needs a connection to an authentication server; the supplicant, on the other hand, communicates via the authenticator—not directly—with the authentication server).

According to the invention, the metric may, in particular, be the number of hops MKD-DISTANZ1; MKD_DISTANZ2 to the mesh key distribution node MKD. Another metric determined based on the data of the mesh routing log can alternatively or additionally be used in accordance with the invention.

To this end, additionally, the capacity of the links or the quality of the radio connection on which the links are based can be taken into account. Further developments of the invention also provide that additional data of the mesh node are included in the metric, such as the type of power supply (a/c power or battery), as well as the state of charge of the battery, or current CPU or network load.

As discussed above, the decision of which of nodes MP-A and MP-B is to be the authenticator is made based on the metric that indicates the better connection, i.e., the values determined, which are taken either independently by measurement or are requested via (protocol) messages, are compared, and the better value for the purpose of an optimal connection determines which node—MP-A or MP-B—is to be assigned the role of authenticator.

If, however, the values are equal, i.e., the metric is the same, according to the invention, the decision is made based on a comparison of the MAC addresses of the two nodes MP-A; MP-B. By way of example, the node with the lesser MAC address may be assigned the role of authenticator, or vice versa. The same can occur if the metric cannot be determined for one or both nodes.

In addition, if the node given the role of supplicant supports several authentication options (EAP methods), an adjusted EAP method for authentication can be selected based on the metric of the authenticator (and its own information, such as battery charge): thus, if the metric is poor, an efficient EAP method can be selected in which only a few messages between the supplicant and the authentication server AAA-S are exchanged and/or only involves minimal power consumption (e.g., because it only uses simple cryptographic operations, such as secret key-based rather than public key-based).

In addition to the selection of the method defined in accordance with the Extensible Authentication Protocol, an option can also be selected within such a method.

Examples of this are, e.g., within EAP-TLS:
The cipher suite used (e.g., AES or DES encryption)
The credential used (e.g., short or long key/certificate
(1024 bit RSA key or 2048 bit RSA key; key/certificate for RSA or for ECC→for elliptical curves ECC, the keys are smaller than with a comparably strong RSA).

These are only some of the EAP method options available. According to the invention, generally any of the possible options can be made dependent on the metric evaluation disclosed by the invention for adjustment and optimization.

The exemplary embodiment only shows a mesh key distributor MKD and/or an authentication server AAA-S that can be reached thereby, but the invention also offers solutions for networks in which a plurality of authentication severs AAA-S or mesh key distributors MKD are present in one network (scaling).

In this case, according to the invention, not only is a metric provided for each mesh node for an authentication server AAA-S or mesh key distributor MKD that it is capable of reaching, but for a plurality of nodes responsible for authentication AAA-S; MKD, generally all of which can be reached by the respective node.

The process disclosed by the invention for such a case is such that, first, a comparison is made of the nodes intended for authentication AAA-S; MKD known to both mesh nodes MP-A; MP-B.

In order to identify the nodes intended for the authentication function MKD, AAA-S and the unique assignment of the respective metrics determined to them, the "MKD identifiers" or the MAC addresses of the nodes intended for the authentication function can be used.

To this end, each of the two mesh nodes MP-A; MP-B compares the nodes known to it that are intended for the authentication function AAA-S; MKD with those of the respective other mesh node MP-A; MP-B. The respective nodes intended for the authentication function can be made known to one another in advance via a message, in particular in the form of an "announcement".

An advantage of this procedure disclosed by the invention is that, if there is a match, fast, mesh net-internal authentication is possible.

According to the invention, therefore, an intersection is formed from the nodes reported that are intended for the authentication function AAA-S; MKD, which contains the nodes intended for the authentication function AAA-S; MKD that were reported by both mesh nodes.

From this intersection, in accordance with the core idea disclosed by the invention, the node intended for the authentication function AAA-S; MKD is selected that shows the best metric, and the role of authenticator is assigned to the node MP-A; MP-B for which this metric was determined for its connection to the selected node performing the authentication function AAA-S; MKD.

The invention also takes into account the case in which no joint node intended for the authentication function AAA-S; MKD exists, i.e., that the intersection is empty. In this case, thus, the node intended for the authentication function AAA-S; MKD with the best metric of all AAA-S; MKD reported is selected, with, in turn, the node MP-A; MP-B becoming the authentication, for the connection of which to the selected node AAA-S; MKD performing the authentication function this metric was determined.

An additional advantage arises from the fact that fewer resources are used for authentication in the mesh network compared to the procedure known from prior art, as the authentication messages in accordance with the invention are always transported over a more efficient path within the mesh network.

In the exemplary embodiment shown in FIG. 2 for the possible variants described above, which were kept relatively simple for better understanding, it is assumed that the first node MP-A and the second node MP-B want to establish a link in the first step.

In the second step, both nodes MP-A; MP-B then signal the respective other in the exemplary embodiment selected, for example, the distance MKD-DISTANZ1; MKD_DISTANZ2 as a metric, i.e., the number of hops to the mesh key distributor MKD.

The drawing shows that a first metric MKD-DISTANZ1 is 3 (hops) for the first node MP-A and a second metric is 2 hops for the second metric MKS-DISTANZ2.

In accordance with the invention, in the exemplary embodiment, the one of the two mesh nodes MP-A; MP-B that has the better metric (lesser value) becomes the authenticator. To this end, the metric values are compared, with the selection criterion being the smaller number of necessary hops in this example, such that, in accordance with the exemplary embodiment, therefore, the second node MP-B is assigned the authenticator role.

The invention claimed is:

1. A method for providing a wireless local area network in which communication devices comprising stationary communication devices as well as mobile communication devices are connected in a form of a mesh as a subnet, said subnet being connected to an infrastructure network and adapted to exchange authentication messages with at least one authentication communication device arranged in the infrastructure network that performs an authentication function, the method comprising:
   attempting to establish a first link from a first communication device of the communication devices to a second communication device of the communication devices, at least one of the first and second communication devices having a connection to at least one authentication communication device of the at least one authentication communication device;
   testing at least one property correlating to connections that the first and second communication devices have to any of the at least one authentication communication device for fulfillment of at least one criterion for assigning an authenticator role to be assigned as part of authentication to one of the first communication device and the second communication device by a process comprising:
      upon a determination that the first communication device has connections to a plurality of authentication communication devices that perform an authentication function and the second communication device has connections to a plurality of authentication communication devices that perform the authentication function, forming an intersection of authentication communication devices to which both the first and second communication devices have a connection,
         assigning the authenticator role to the first communication device or the second communication device based upon which of the first communication device and the second communication device has a connection with one of the authentication communication devices of the intersection that has the at least one property that best fulfills the at least one criterion; and
      upon a determination that the intersection is empty such that there is no authentication communication device that has a connection with each of the first and second communication devices:
         assigning the authenticator role to the first communication device or the second communication device based upon which of (i) a first connection of the first communication device to one of the at least one authentication communication device and (ii) a second connection of the second communication device to a different one of the at least one authentication communication device has the at least one property that best fulfills the at least one criterion;
   the first communication device comparing the at least one authentication communication device to which the second communication device is connected with the at least one authentication communication device connected to the first communication device, the at least one authentication communication device to which the second communication device is connected being made known to the first communication device prior to the comparing of the at least one authentication communication device performed by the first communication device; and
   the second communication device comparing the at least one authentication communication device to which the first communication device is connected to the at least one authentication communication device connected to the second communication device, the at least one authentication communication device to which the first communication device is connected being made known to the second communication device prior to the comparing of the at least one authentication communication device performed by the second communication device.

2. The method of claim 1 wherein the at least one criterion is comprised of a lowest number of hops along a route forming a connection to the at least one authentication communication device performing the authentication function and the at least one property is comprised of a metric defining a number of hops to an authentication communication device.

3. The method of claim 1 wherein the at least one criterion comprises at least one value that is determinable based on data of a routing log.

4. The method of claim 3 wherein the routing log is a mesh routing log.

5. The method of claim 1 wherein the at least one criterion is a minimum number of hops along a route forming a connection to the at least one authentication communication device performing the authentication function.

6. The method of claim 1 wherein the at least one criterion comprises a value indicating a best quality of a physical property, the physical property comprising a signal quality and the value indicating best quality of the physical property comprising a value indicating superior signal quality.

7. The method of claim 1 wherein the at least one criterion comprises a value indicating a minimum capacity for a connection to any of the at least one authentication communication device.

8. The method of claim 1 wherein the at least one criterion comprises a power supply for the subnet or the infrastructure network.

9. The method of claim 1 wherein the at least one criterion comprises a minimum processor use.

10. The method of claim 1 further comprising:
   upon a determination that the testing shows that the at least one property for the first connection and the second connection coincide, assigning the authenticator role based on a comparison of Media Access Control ("MAC") addresses of the first communication device and the second communication device.

11. The method of claim 10 wherein the authenticator role is assigned to which of the first communication device and the second communication device has a smaller MAC address.

12. The method of claim 1 further comprising:
upon determining that results of the testing cannot be determined, assigning the authenticator role based on a comparison of Media Access Control ("MAC") addresses of the first communication device and the second communication device.

13. The method of claim 12 wherein the authenticator role is assigned to which of the first communication device and the second communication device has a smaller MAC address.

14. The method of claim 1 wherein an adaptation of an authentication method takes place based on results of the testing.

15. The method of claim 14 wherein the adaptation of the authentication method comprises a selection of an authentication method defined in accordance with Extensible Authentication Protocol ("EAP").

16. The method of claim 1 wherein the at least one authentication communication device comprises at least one mesh key distributor and at least one authentication server.

17. A communication apparatus comprising:
a first communication device that is connectable to at least one authentication communication device;
the first communication device configured to establish a first link to a second communication device;
the first communication device configured to test at least one property correlating to connections that the first and second communication devices have to the at least one authentication communication device for fulfillment of at least one criterion for assigning an authenticator role to be assigned as part of authentication to one of the first communication device and the second communication device by a process comprising:
upon a determination that the first communication device has connections to a plurality of authentication communication devices that perform an authentication function and the second communication device has connections to a plurality of authentication communication devices that perform the authentication function, forming an intersection of authentication communication devices to which both the first and second communication devices have a connection, and
assigning the authenticator role to the first communication device or the second communication device based upon which of the first communication device and the second communication device has a connection with one of the authentication communication devices of the intersection that has the at least one property that best fulfills the at least one criterion; and
upon a determination that the intersection is empty such that there is no authentication communication device that has a connection with each of the first and second communication devices:
assigning the authenticator role to the first communication device or the second communication device based upon which of (i) a first connection of the first communication device to one of the at least one authentication communication device and (ii) a second connection of the second communication device to a different one of the at least one authentication communication device has the at least one property that best fulfills the at least one criterion; and
the first communication device comparing the at least one authentication communication device to which the second communication device is connected with the at least one authentication communication device connected to the first communication device.

18. The communication apparatus of claim 17, comprising the second communication device, the second communication device configured such that, upon the determination that the intersection is empty such that there is no authentication communication device that has a connection with each of the first and second communication devices, the second communication device compares the at least one authentication communication device to which the first communication device is connected to at least one authentication communication device connected to the second communication device.

19. The communication apparatus of claim 18, comprising:
at least one authentication communication device connected to the second communication device and at least one authentication communication device connected to the first communication device; and
wherein the first and second communication devices are configured so that:
the at least one authentication communication device to which the first communication device is connected is made known to the second communication device prior to the comparing of the at least one authentication communication device performed by the second communication device; and
the at least one authentication communication device to which the second communication device is connected is made known to the first communication device prior to the comparing of the at least one authentication communication device performed by the first communication device; and
wherein the apparatus is configured as a mesh network.

20. A network comprising:
a first communication device;
a second communication device;
a plurality of authentication communication devices connectable to at least one of the first communication device and the second communication device;
the first and second communication devices configured to connect to each other via an establishment of a first link, the first and second communication devices configured so that the establishment of the first link is performed such that that: testing at least one property correlating to connections that the first and second communication devices have to any of the authentication communication devices for fulfillment of at least one criterion for assigning an authenticator role to be assigned as part of authentication to one of the first communication device and the second communication device is performed by a process comprising:
upon a determination that the first communication device has connections to authentication communication devices that perform an authentication function and the second communication device has connections to authentication communication devices that perform the authentication function, forming an intersection of authentication communication devices to which both the first and second communication devices have a connection, assigning the authenticator role to the first communication device or the second communication device based upon which of the first communication device and the second communication device has a connection with one of the authentication communication devices of the intersection that has the at least one property that best fulfills the at least one criterion; and upon a determination that the intersection is empty such that there is no authentication communication device that has a connection with each of the first and second communication devices:

assigning the authenticator role to the first communication device or the second communication device based upon which of (i) a first connection of the first communication device to a first authentication communication device of the authentication communication devices and (ii) a second connection of the second communication device to a second authentication communication device of the authentication communication devices has the at least one property that best fulfills the at least one criterion;

the first communication device comparing the second authentication communication device to which the second communication device is connected with the first authentication communication device connected to the first communication device, the second authentication communication device to which the second communication device is connected being made known to the first communication device prior to the comparing of the first and second authentication communication devices performed by the first communication device; and the second communication device comparing the first authentication communication device to which the first communication device is connected to the second authentication communication device connected to the second communication device, the first authentication communication device being made known to the second communication device prior to the comparing of the first and second authentication communication devices performed by the second communication device.

* * * * *